United States Patent [19]

Nishimura et al.

[11] Patent Number: 4,532,417
[45] Date of Patent: Jul. 30, 1985

[54] CASH ACCOUNTING SYSTEM

[75] Inventors: Katsuji Nishimura, Habikino; Hachizou Yamamoto, Nara, both of Japan

[73] Assignee: Sharp Kabushiki Kaisha, Osaka, Japan

[21] Appl. No.: 470,778

[22] Filed: Feb. 28, 1983

[30] Foreign Application Priority Data

Mar. 8, 1982 [JP] Japan .................................. 57-36780

[51] Int. Cl.³ ............................................. G06F 15/30
[52] U.S. Cl. .................................................... 235/379
[58] Field of Search ......................... 235/379; 364/468

[56] References Cited

U.S. PATENT DOCUMENTS 4,438,326 3/1984 Uchida ................................. 235/379

Primary Examiner—Harold I. Pitts

Attorney, Agent, or Firm—Birch, Stewart, Kolasch & Birch

[57] ABSTRACT

A cash accounting system comprises a manual handling instruction unit for instructing the manual handling of some denominations and sub-amounts of the payment money-amount. A storing unit stores the denominations, sub-amounts, etc. instructed to be manually handled by the instruction unit, a controlling unit for paying out, by the money paying-out apparatus, the remaining payment amount of the money amount instructed to be manually handled by the manual handling instruction unit. As the payment by the money paying-out apparatus and the payment by the manual operation can be performed in combination within one transaction registration, time required for the money amount, including the new bill, to be paid out is rendered shorter and transaction error is prevented from being caused.

1 Claim, 13 Drawing Figures

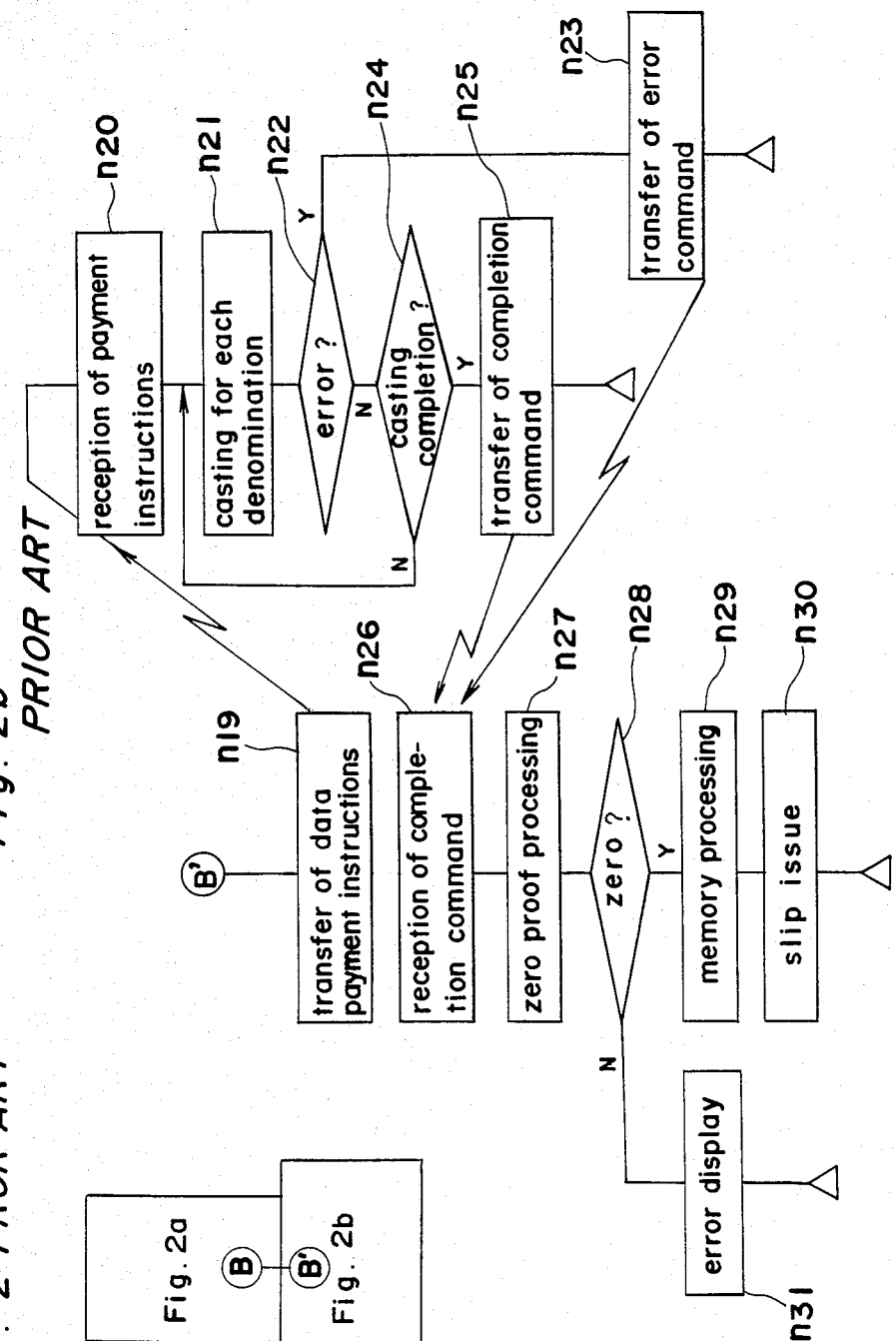

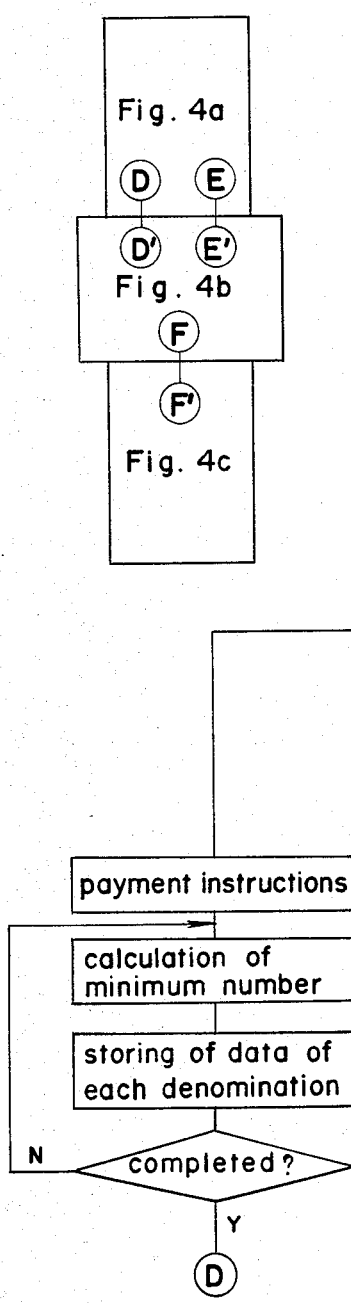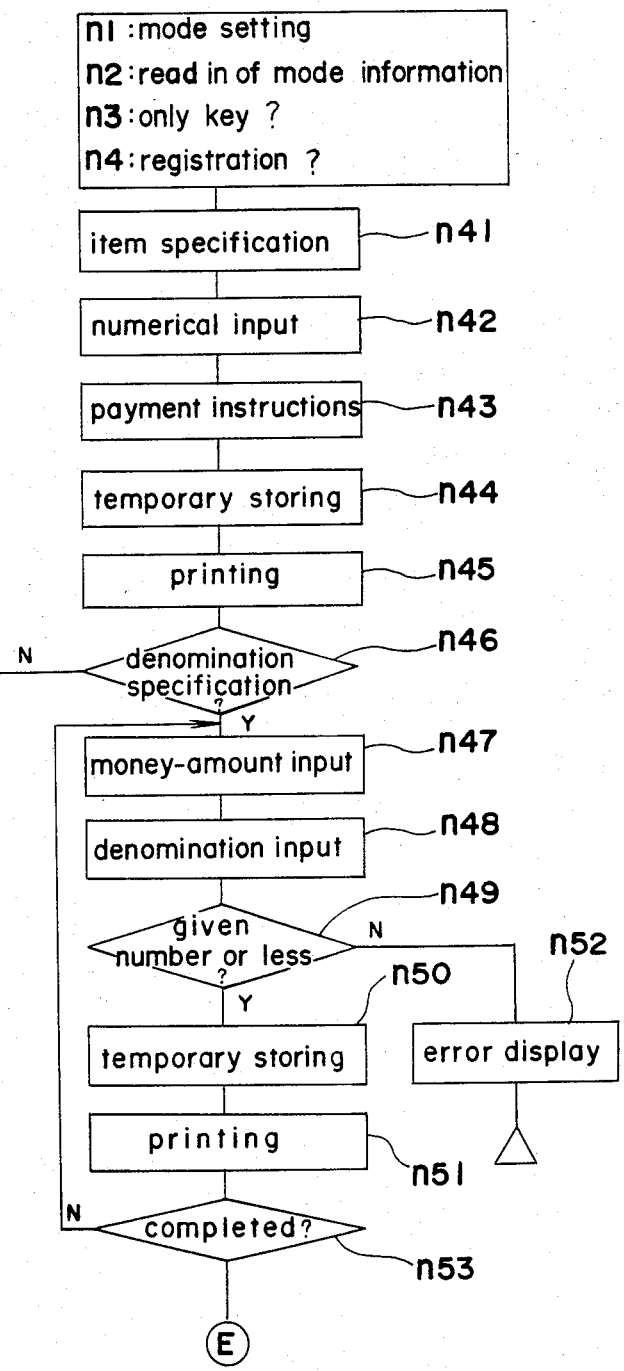

CASH ACCOUNTING SYSTEM

BACKGROUND OF THE INVENTION

The present invention relates to improvements in a cash accounting system which is used in the window services of banks or the like, and more particularly to improvements in a cash accounting system, wherein a cash accounting apparatus for registering and processing various cash transaction informations is electrically connected with a money paying-out apparatus for paying out money, such as bills, coins, corresponding to the amount due caused by each of the transaction registrations.

Conventionally, a cash accounting system for payment services, which is used in the window services of banks or the like is constructed as shown in FIG. 1, wherein a cash accounting apparatus I and a money paying-out apparatus II are electrically connected with each other through a line L.

In the cash accounting apparatus I, a function keyboard 1 includes item keys I through N of ordinary account, current account, etc., a payment key A, a denomination key t, a payment instruction key T. Reference numeral 2 is a key discriminating unit of the function keyboard 1, reference numeral 3 is a central processing unit (CPU), reference numeral 4 is a numerical input unit, reference numeral 5 is a key encoder, reference numeral 6 is a primary address counter, and reference numeral 7 is a primary memory, for storing various data, which has a money-amount information area b and a denomination memory area c. Reference numeral 8 is the primary input/output controlling unit of the memory 7, reference numeral 9 is a printing unit, reference numeral 10 is a displaying unit, reference numeral 11 is a read-only memory (ROM) for storing a micro-programme necessary to control the sequence of operation of the apparatus. Also, reference numeral 12 is a secondary address counter, reference numeral 13 is a secondary input/output controlling unit, reference numeral 14 is a secondary memory for storing each of the registration data, reference numeral 15 is a mode selecting unit for setting the apparatus into a setting mode, a registration mode, a minute-investigation mode or the like. The selection signal of the mode selecting unit 15 is stored in a mode information storing unit 16 and the mode selecting information stored in the storing unit 16 is adapted to be transferred to and stored in the given area a of the central processing unit 3, in accordance with the output of a detecting unit 17 for detecting the depression action of the function keyboard 1 or the numerical input unit 4. Also, reference numeral 18 is a data transfer controlling unit and the denomination information of the money-to-be-paid-out, together with a control signal is adapted to be delivered onto the side of the money paying-out apparatus II through the line L.

Also, in the money paying-out apparatus II, reference numeral 19 is a data transfer controlling unit which receives the paying-out information, of different denominations, to be fed from the side of the cash accounting apparatus I. Reference numeral 20 is a money paying-out controlling unit. Reference numeral 21 is a driving unit, which receives the signal of the money paying-out controlling unit 20 to operate the money casting mechanism of a money accommodation portion 22 where money is accommodated in accordance with different denominations. Reference numeral 23 is a counting unit which counts the number of money cast to stop the casting operation when the money has reached the specified number. Reference numeral 24 is a tray for receiving money to be deposited, which money may include one or both of papers and coins. Reference numeral 25 is a cast confirming unit for confirming whether or not all the denominations and the money amount specified has been cast. The confirmation signal of the cast confirming unit 25 is adapted to be inputted to the paying-off controlling unit 20.

In such construction as described hereinabove, assume that the payment processing services are performed by the use of the case accounting system. As shown in the operation flow chart of FIG. 2, an operator selects the mode selection unit 15 into the registration mode to set the apparatus into the registration mode thereby to input and store the registration mode information into the mode information storing unit 16 (at the stage n1 of FIG. 2). Then, when the operator has depressed the numerical input unit 4 and either of the keys of the function keyboard 1 to register the transaction, the key input signal is detected (at the stage n2) by the detecting unit 17. The registration mode information stored in the storing unit 16 is inputted and stored into the given area a of the central processing unit 3 (at the stage n3). When the registration mode information has been inputted and stored into the area a, the central processing unit 3 selects (at the stage n4) the registration processing programme of the ROM 11 thereby to process, as the registration data, the data to be thereafter inputted.

After the apparatus has been set into the registration mode in the same manner as described hereinabove, a particular key of the item keys I through N of the function keyboard 1 is pressed to instruct which item (i.e., either ordinary account or current account) the transaction belongs to thereby to input the item information to the central processing unit 3 through the key discriminating unit 2 (at the stage n5). Then, the operator inputs the transaction money-amount to the central processing unit 3 through the key encoder 5 from the numerical input unit 4 (at the stage n6). Then, the operator presses the payment key A of the function keyboard 1 to instruct that the money-amount information previously inputted into the central processing unit 3 through the key discriminating unit 2 is the payment information (at the state n7). The central processing unit 3 which has received the instructions inputs and stores the money-amount information, through the primary input/output controlling unit 8, to the given area b of the primary memory 7 to be specified by the primary address counter 6 (at the stage n8). The data are printed (at the stage n9) on slip, etc. by the printing unit 9, and are displayed by the display unit 10. The operator decides whether or not the denomination is specified (at the stage n10). When the payment money-amount is specified in denomination, the breakdown denomination and money-amount of different denominations are inputted to the central processing unit 3 through the manipulation of the numerical input unit 4 and the denomination key t on the function keyboard 1 (at the stages n11, n12). At this time, it is decided at the stage n13 whether or not the denomination money-account can be paid out by the money paying-out apparatus II. If it can be paid out, the denomination and the money-amount informations are inputted and stored in the area c of the primary memory 7 (at the stage n14) and are printed on slip, etc. by the printing unit 9 (at the stage n15).

If the specified denomination and money-amount cannot be paid out, an error display is performed to that effect on the display unit 10 (at the stage n16).

When the inputting operation of all the denominations and money amount has been completed in this manner (at the stage n17), the operator depresses the paying-out instruction key T of the function keyboard 1 to give the money paying-out instructions to the central processing unit 3 through the key discriminating unit 2 (at the stage n18). The central processing unit 3 which has received the instructions transfers the denominations and money-amount information, stored in the area c of the primary memory 7, together with a payment-out command to the money payment-out apparatus II through a data transfer controlling unit 18 (at the stage n19).

The money paying-out apparatus II, which has received, through a data transfer controlling unit 19, the paying-out command and the denominations, money-amount data, operates a driving unit 21 under the control of the payment controlling unit 20 thereby to cast the bills and coins of different denominations, accommodated in an accommodating unit 22, on a tray 24 (at the stages n20, n21). The cast signal is counted by a counting unit 23 and the counted signal is inputted to a cast confirming unit 25 to confirm whether or not the specified denominations and money amount have been positively cast. The confirmation signal is inputted to the paying-out controlling unit 20. When the paying of all the denominations and money amount has been completed through repetition of such operations, the money paying-out apparatus II transfers a payment completion command to the cash accounting apparatus I (at the stages n22 through n25). The central processing unit 3 (at the stage n26), which has received the payment completion command determines whether or not the total of the sub-amounts of the payment previously inputted is equal to the total of the sub-amounts of different denomination paid just by the money paying-out apparatus II (at the stage n27). If they are equal to each other (at the stage n28), the data stored in each area of the primary memory 7 is inputted and stored (at the stage n29), through a secondary input/output controlling unit 13, in the given area of the secondary memory 14 to be specified by the secondary address counter 12. The printing unit 9 issues (at the stage n30) the slip of the transaction and furthermore clears the stored contents of the primary memory 7 in preparation for the following transaction registration.

The above description is given about a case where the denomination has been specified, and if the denomination is not required to be specified, the operator depresses the payment instruction key T of the function keyboard 1 (at the stage n32) when the inputting operation of the payment money-amount has been completed to give payment instructions to the central processing unit 3. The central processing unit 3 which has received the instructions calculates (at the stage n33) the number of the cast money of different denominations so that the denominations may be minimum in number in accordance with the previously inputted money-amount information to temporarily store (at the stage n34) each of the denominations and money amount data in the primary memory 7. When the operation of all the denominations has been completed (at the stage n35) in this manner, the central processing unit 3 transfers (at the stage n19) the paying instructions of the money to the money payment-out apparatus II in the same manner as described hereinabove to cast the denomination and money amount of a given number.

As decribed hereinabove, in the conventional cash accounting system, the payment denomination and money amount was always paid from the money payment-out apparatus. For example, when the new bills, etc. were required about a certain money-amount of some denomination of the payment money-amount, the desired denomination money-amount of the denomination money-amount paid out after the transaction had been completed was required to be replaced by the new bills. More time was required to perform the registration processing operations, and more errors might be made in transaction.

SUMMARY OF THE INVENTION

An object of the present invention is to provide a cash accounting system, which is free from the above-described problems.

Another object of the present invention is to provide a cash accounting system wherein a cash accounting apparatus for registering and processing various cash transaction information is electrically connected with a money paying-out apparatus for paying out money such as bills, coins, corresponding to the amount due caused by each transaction registration, wherein the payment by the money paying-out apparatus and the payment by the manual operation can be performed in combination within one transaction registration, resulting in that time required for the money amount, including the new bill, to be paid out is rendered shorter and transaction error is prevented from being caused. To achieve the object, in a cash accounting system wherein a cash accounting apparatus for registering and processing the various cash transaction information is electrically connected with a money paying-out apparatus, which pays out money such as bills coins, etc. corresponding to the paying money-amount caused by each of the transaction registrations, the present invention comprises a manual handling instruction unit which instructs the hand operation of some denomination and money amount of the paying-out money amount, a storing unit, which stores the denomination, money amount, etc. instructed to be manually handled by the instruction unit, and a controlling unit, which pays from the money paying-out apparatus the payment amount of the rest of the money amount instructed to be manually handled by the manual handling instruction unit. The automatic payment of money by the money paying-out apparatus and the manually operated payment of the sub-amount of the payment demonination and money amount are adapted to be jointly performed within one transaction registration.

BRIEF DESCRIPTION OF THE DRAWINGS

These and other objects and features of the present invention will become apparent from the following description taken in connection with preferred embodiment thereof with reference to the accompanied drawings, in which.

DETAILED DESCRIPTION OF THE INVENTION

Figure 3:
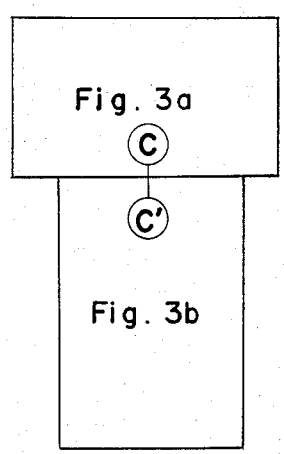
FIG. 3 to be confirmed with FIG. 3a and FIG. 3b is a block diagram showing the construction of the money accounting system of the present invention.
Figure 3B:
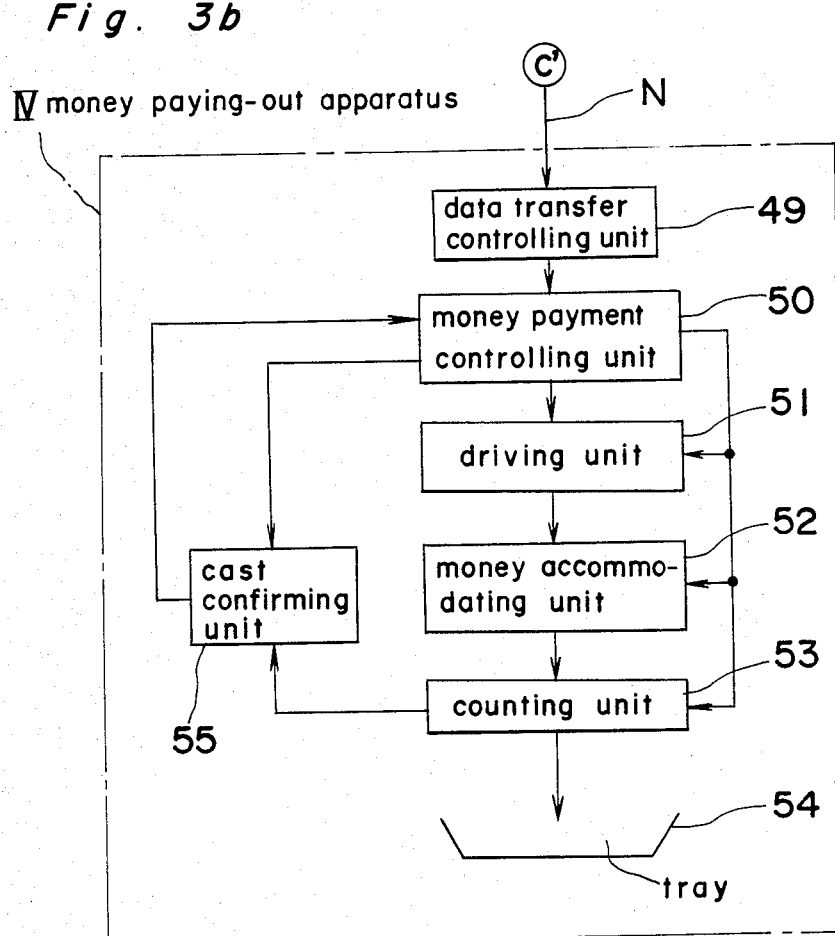
Figure 3A:
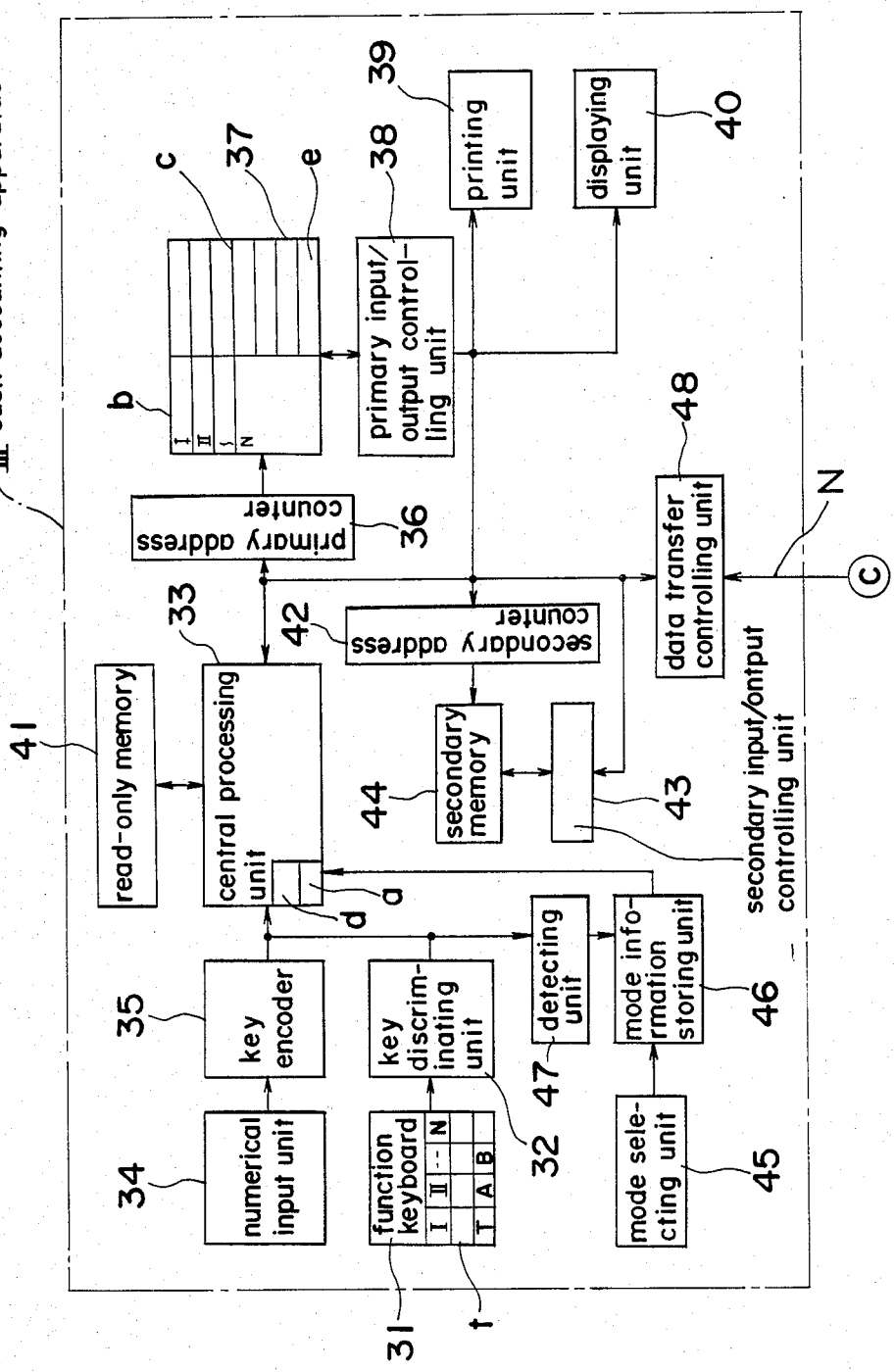

Referring now to FIG. 3, a cash accounting apparatus III is electrically connected with a money paying-out apparatus IV through a connection line N.

In the cash accounting apparatus III, a function keyboard 31 comprises item keys I through N such as ordinary account, current account, etc., a payment key A, a denomination key t, a payment instruction key T and a hand instruction key B.

The function keyboard 31 is connected to a central processing unit 33 (CPU) through a key discriminating unit 32 which is also connected to a key encoder 35 and a detecting unit 47 connected with a mode information storing unit 46 for storing a selection signal of a mode information. A numerical input unit 34 is connected to the central processing unit 33 through the key encoder 35, while a mode selecting unit 45 for setting the cash accounting apparatus III into a setting mode, a registration mode, a detailed investigation mode or the like is connected to the central processing unit 33 through the mode information storing unit 46. The selection signal of the mode selecting unit 45 is stored in a mode information storing unit 46. The mode selecting information stored in the storing unit 46 is adapted to be transferred and stored in the given area a of the central processing unit 33 in accordance with the output of the detecting unit 47 for detecting the depressing action of the function keyboard 31 or the numerical input unit 34. The central processing unit 33 is adapted to have a hand instruction condition storing area d wherein the operating condition of the hand instruction key B is stored. Also, a read-only memory 41 (ROM) for storing a microprogramme necessary to control the sequence of operation of the cash accounting apparatus III is connected to the central processing unit 33 which is in turn connected to a primary address counter 36, a secondary address counter 42, a primary input/output controlling unit 38, a secondary input/output controlling unit 43, a data transfer controlling unit 48, a printing unit 39 and a displaying unit 40. A primary memory 37 for storing the various data which has a money-amount information area b, a denomination information area c and a hand denomination money-amount information area e, is connected to the central processing unit 33 through the primary address counter 36 and the primary input-/output controlling unit 38 for the memory 37. Also, a secondary memory 44 for storing various registration data is connected to the central processing unit 33 through the secondary address counter 42 and the secondary input/output controlling unit 43 for the memory 44. The cash accounting apparatus III as constructed with all of the above members 31 to 48 is adapted to deliver a controlling signal of the data transfer controlling unit 48 together with the information of difference denominations of the money to be paid out onto the side of a money paying-out apparatus IV through a connecting line N connected between the data transfer controlling unit 48 and a data transfer controlling unit 49 of the money paying-out apparatus IV.

In the money paying-out apparatus IV, the data transfer controlling unit 49 is adapted to receive the payment information of different denominations to be fed from the side of the cash accounting apparatus III. The data transfer controlling unit 49 is connected in series a money payment controlling unit 50, a driving unit 51, a money accommodating unit 52, and a counting unit 53. The driving unit 51 is adapted to drive the money casting mechanism of the money accommodating unit 52 accommodated for each of the denominations in response to an signal of the money payment controlling unit 50. The counting unit 53 is adapted to count the number of the cast money to stop the casing operation when the number of the money has become a specified one. Below the counting unit 53 there provides a tray 54 for receiving the cast money. Also, the counting unit 53 is connected to the money payment controlling unit 50 through a cast confirming unit 55 for confirming whether or not all of the denominations and money amount specified have been cast. A confirming signal of the cast confirming unit 55 is adapted to be inputted to a payment controlling unit 50. The operation of the cash accounting system consisting of the cash accounting apparatus III and money paying-out apparatus IV will be described hereinafter with reference to the operation flow chart as shown in FIG. 4.

Figure 4B:
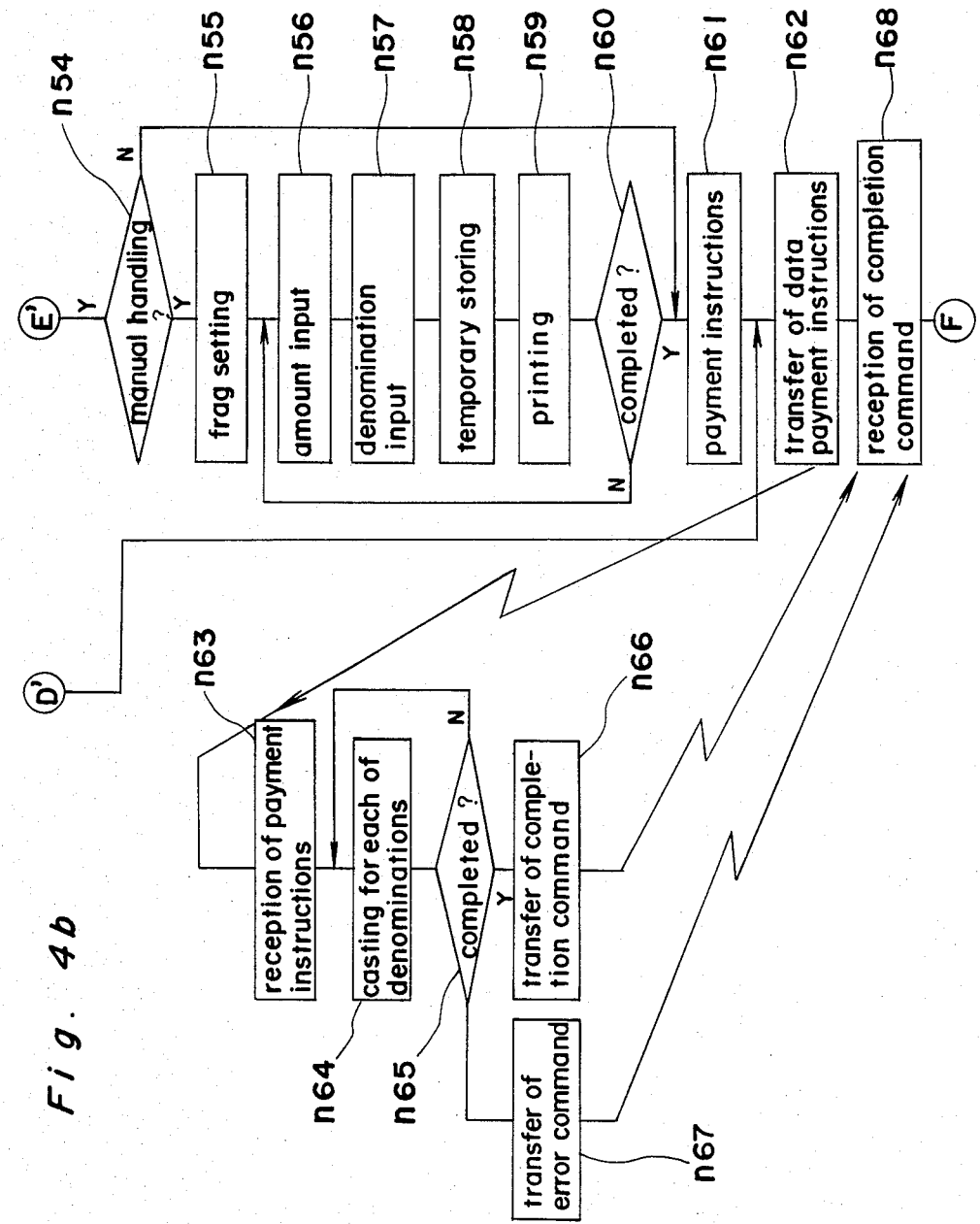
FIG. 4 to be confirmed with FIG. 4a through FIG. 4c is an operation flow chart for illustrating the operation of FIG. 3.
Figure 4C:
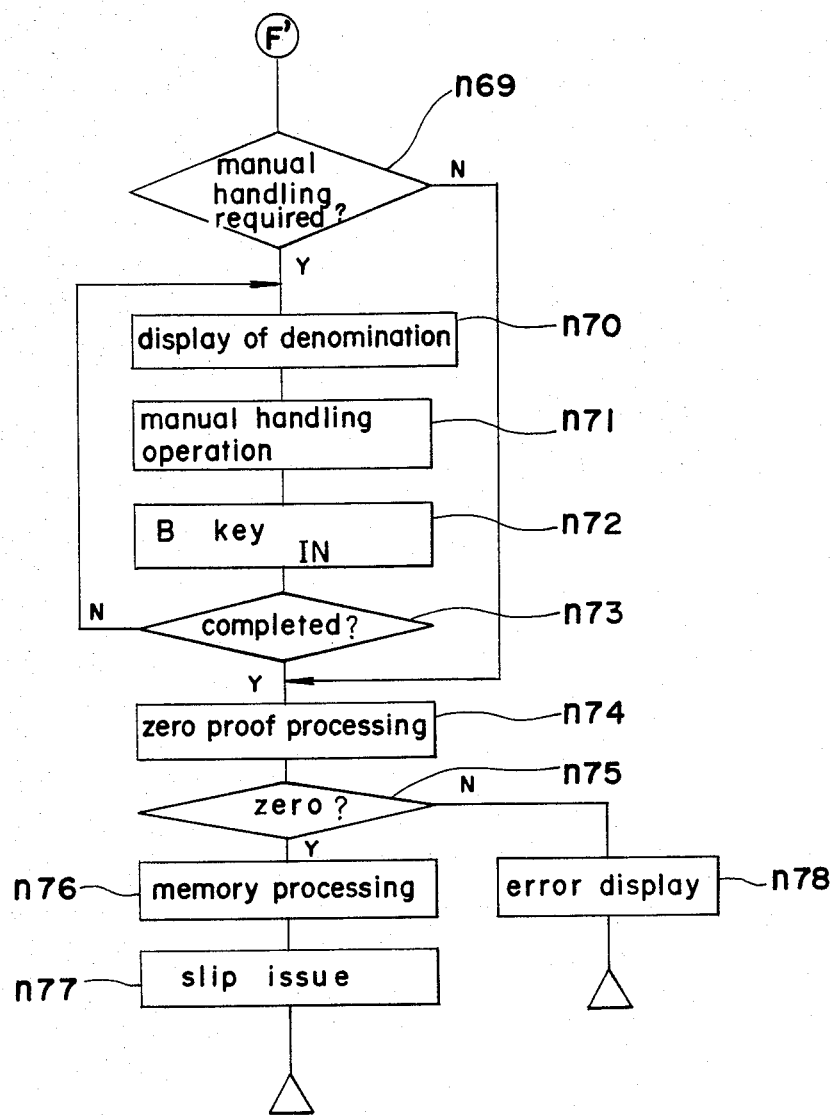

Referring to FIG. 4, the setting operation of the cash accounting apparatus III is made in the same manner as that of the conventional apparatus. At first, an operator selects the mode selection unit 45 into the registration mode to set the apparatus III into the registration mode thereby to input and store the registration mode information into the mode information storing unit 46 (at the stage n1 of FIG. 4a). Then, when the operator has depressed the numerical input unit 34 and either of the keys of the function keyboard 31 to register the transaction, the key input signal is detected (at the stage n2) by the detecting unit 47. The registration mode information stored in the storing unit 46 is inputted and stored into the given area a of the central processing unit 33 selects (at the stage n3). When the registration mode information has been inputted and stored into the area a, the central processing unit 33 selects (at the stage n4) the registration processing programme of the read-only memory 41, thereby to process, as the registration data, the data to be thereafter inputted.

After the apparatus III has been set into the registration mode in the same manner as described hereinabove, a particular key of the item keys I through N of the function keyboard 31 is pressed by the operator to instruct which item (i.e., either ordinary account or current account) the transaction belongs to thereby to input the item information to the central processing unit 33 through the key discriminating unit 32 (at the stage n41). Then, the operator inputs (at the stage n42) the transaction money-amount to the central processing unit 33 through the key encoder 35 from the numerical input unit 34. In addition the operator depresses the payment key A of the function keyboard 31 to instruct that the money-amount information previously inputted in the central processing unit 33 through the key discriminating unit 32 is the payment information (at the stage n43). The central processing unit 33, which has received the instructions inputs and stores the money-amount information in the given area b of the primary memory 37, to be specified by the primary address counter 36, through the primary input/output controlling unit 38 (at the stage n44). The data are printed on slip or the like by a printing unit 39 (at the stage n45) and are displayed by a displaying unit 40.

Then, the operator decides whether or not the denomination has been specified (at the stage n46), and if specified, the breakdown money-amount of the different denominations of the money amount to be paid out by the money paying-out apparatus IV from the payment money-amount is inputted into the central processing unit 33 through the operation of the denomination key t on the numerical input unit 34 and the function keyboard 31 (at the stages n47, n48). At this time, it is decided whether or not the money-amount inputted can be paid out by the money paying-out apparatus IV (at the stage n49). If it can be paid out, the denomination money-amount information is inputted and stored in the area c of the primary memory 37 (at the stage n50) and is printed on the slip or the like by a printing unit 39 (at the stage n51). If the specified denomination money-amount cannot be paid out, error display is made on the display unit 40 to this effect (at the stage n52).

When the specifying and inputting operations of all the denominations, money amount to be paid out from the money paying-out apparatus IV have been completed (at the stage n53) as described hereinabove, the operator depresses a manually handled key B of the function keyboard 31 to instruct that the data to be thereafter inputted to the central processing unit 33 through the key discriminating unit 32 are manually handled denomination money-amounts (at the stage n54). At this time, flag indicating that the manual operation has been instructed is set on the area d of the central processing unit 33 (at the stage n55).

Then, the operator inputs the money amount instructed manually into the central processing unit 33 from the numerical input means 34 (at the stage n56) and inputs the denomination information to the central processing unit 33 by the use of the denomination key t of the function keyboard 31 (at the stage n57). The operator inputs and stores the information of the denominations and money-amounts in the area e of the primary memory 37 (at the stage n58) to print the data on slip, or etc. by a printing unit 39 (at the stage n59). When the inputting operation of all the money amounts of the denominations manually handled have been completed through the repeated operation (at the stage n60), the operator depresses the payment instruction key T of the function keyboard 31 to give the money payment instructions to the central processing unit 33 through the key discriminating unit 32 (at the stage n61).

The central processing unit 33, which has received the instructions, transfers not only a payment command to the money paying-out apparatus IV through the data transfer controlling unit 48, but also the money-amount information of different denomination stored in the area c of the primary memory 37 (at the stage n62). The money paying-out apparatus IV, which has received the payment command and the denomination, money-amount data through the data transfer controlling unit 49 (at the stage n63), operates a driving unit 51 under the control of the payment controlling unit 50 to cast the bills, coins, accommodated within an accommodating unit 52, onto a tray 54 in accordance with each of the denominations specified (at the stage n64). The casting signal of the driving unit 51 is counted by a counting unit 53. The counting signal of the counting unit 53 is inputted to the cast confirming unit 55 to confirm whether or not the specified denominations and money-amounts have been positively cast. The confirmation signal of the cast confirming unit 55 is inputted to the payment controlling unit 50.

When the payment of all the denomination and money amounts have been completed through repetition of such operation as described hereinabvoe (at the stage n65), the money paying-out apparatus IV transfers a payment completion command to the cash accounting apparatus III (at the stage n66).

The central processing unit 33, which has received the payment completion command (at the stage n68), checks the existence or absence of the flag in the given area d of the central processing unit 33 (at the stage n69) to confirm whether or not the manual handling operation has been specified. When the flag has been set, the central processing unit 33 displays the denomination, money-amount information of the area e of the primary memoy 37 on a read-in display unit (at the stage n70). The operator pays out the specified denominations and money amounts from the money on hand, looking at the display unit 40 (at the stage n71). When one payment of the denomination, money amount has been completed, the operator depresses the manual handling key B of the function keyboard 31 (at the stage n72) to perform the read-out display of the following denomination, money amount (at the stage n70).

When the payment of all the denominations, money amounts manually handled has been completed as described hereinabove (at the stage n73), the central processing unit 33 subtracts, from the initially inputted payment total sum, the payment money-amount from the money paying-out apparatus IV stored in the area c of the primary memory 37 and the manually handled money-amount stored in the area e to execute a zero-proof processing operation to decide whether or not the subtraction result is "0" (at the stage n74). If the subtraction result is "0" (at the stage n75), each of the memory data of the primary memory 37 is inputted and stored through the secondary input/output controlling unit 43 in the given area of the secondary memory 44 to be specified by the secondary address counter 42 (at the stage n76). Each of the memory data of the primary memory 37 is cleared in readiness for the following transaction registration. At this time, the slip of the transaction is issued (at the stage n77) from the printing unit 39 (at the stage n77). Unless the subtraction result is "0", the error display is made on the display unit 40 (at the stage n78).

Figure 1:
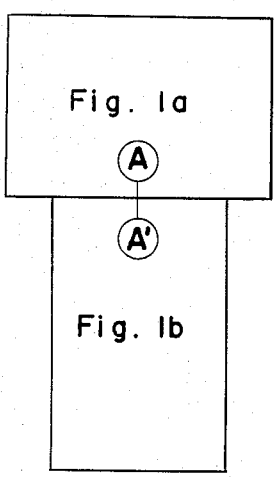
FIG. 1 to be combined with FIG. 1a and FIG. 1b is a block diagram showing the construction of the conventional cash accounting system as already referred above.
Figure 1B:
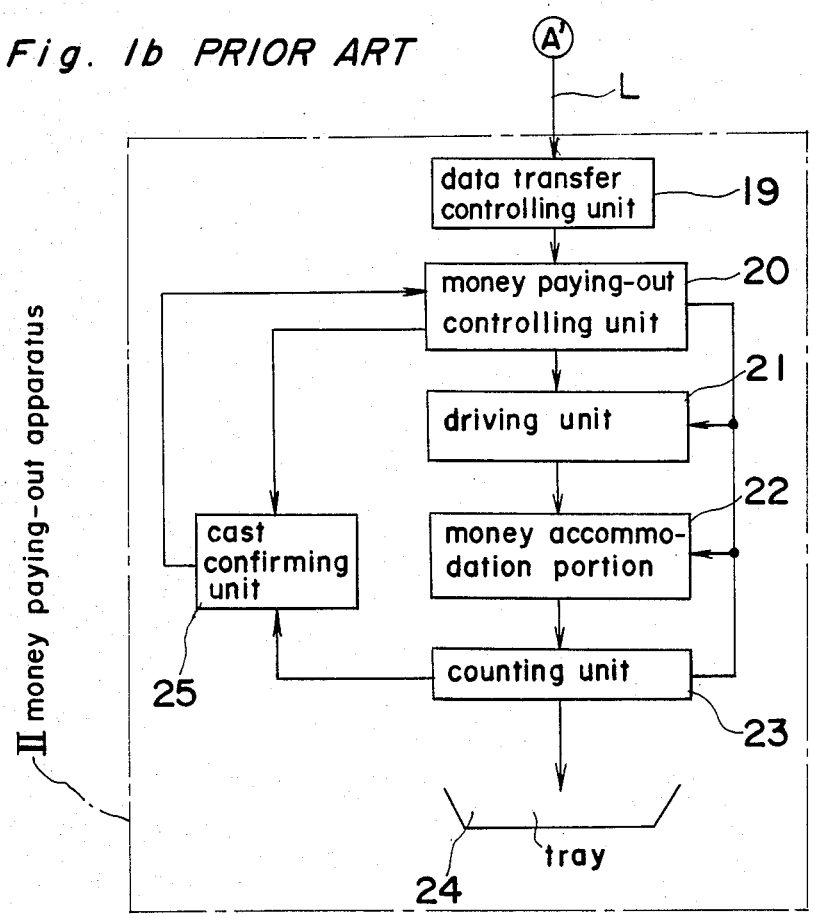
Figure 1A:
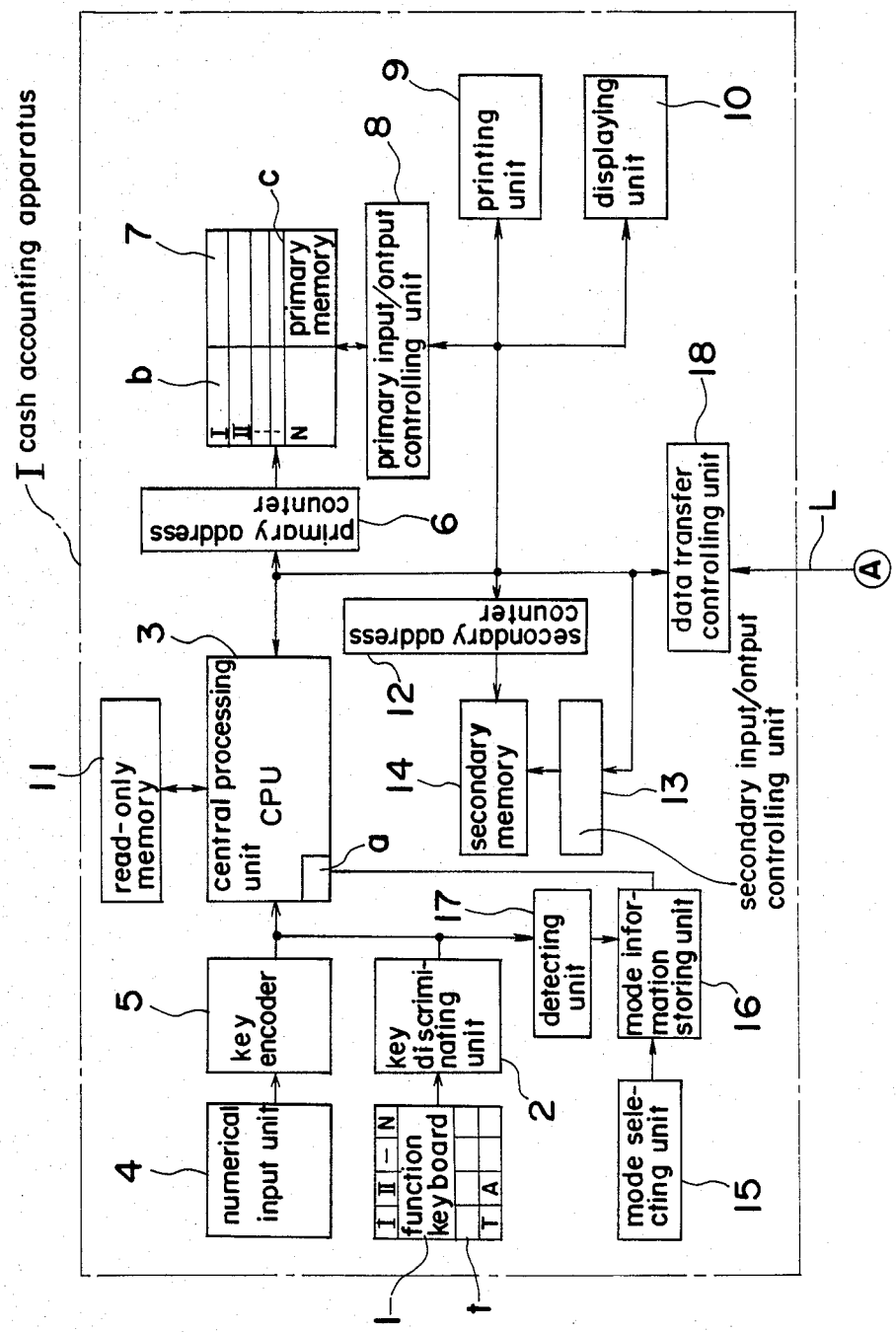
Figure 2A:
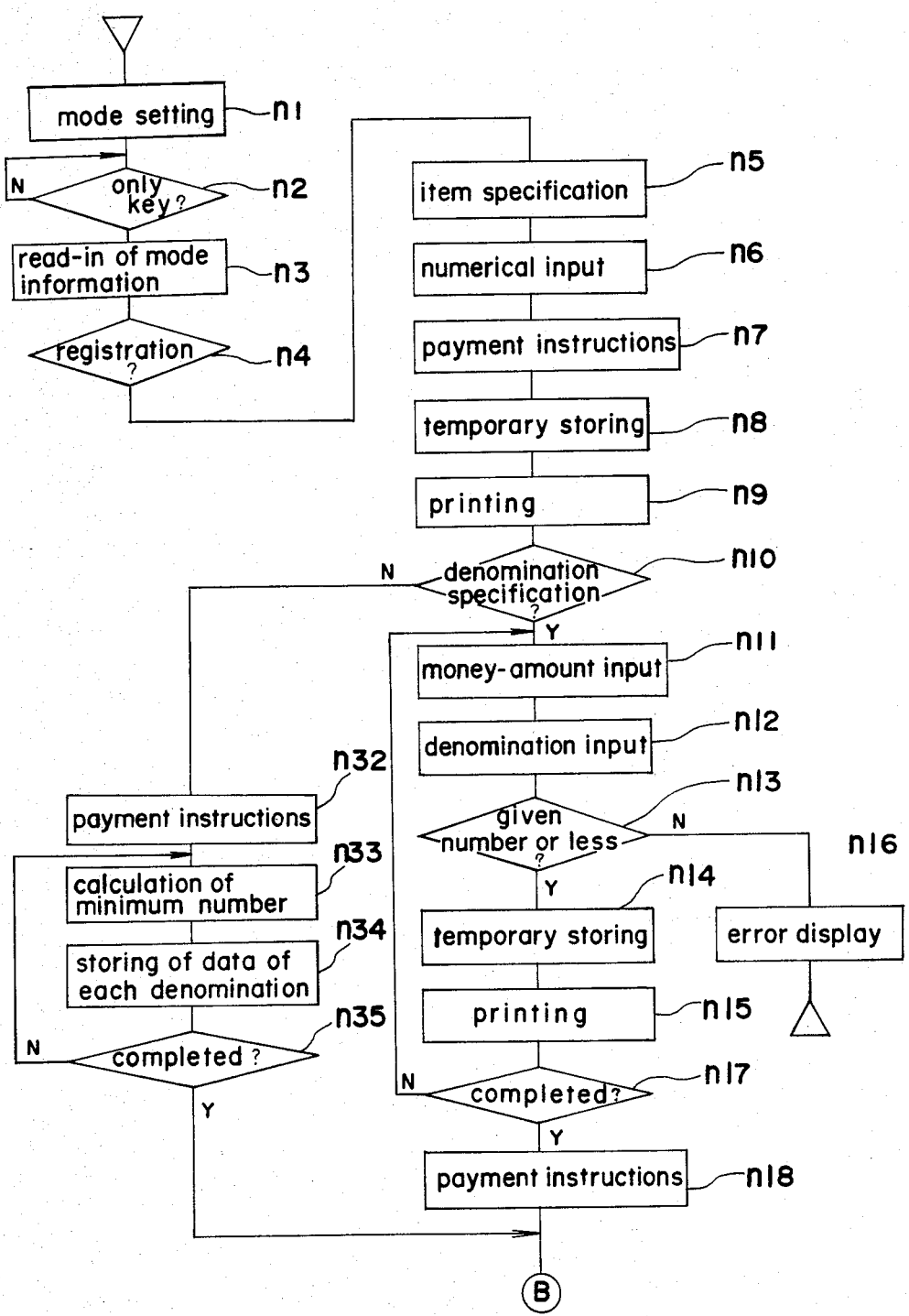
FIG. 2 to be confirmed with FIG. 2a and FIG. 2b is an operation flow chart for illustrating the operation of FIG. 1.

As the operating method, etc. in a case where the denomination is not specified, is similar to the operation of the conventional apparatus shown in FIG. 1 and FIG. 2, the description thereof will be omitted for the sake of brevity.

The manually handling operation of the described denomination, money amount is performed in combination with the payment operation of the money paying-out apparatus, and, for example, the new bills or the like can be paid out by the manually handling operation. Accordingly, the payment by the money paying-out apparatus and the payment by the manual operation can be performed in combination within one transaction registration. Thus, some portion of the payment money-amount can be paid out by the manual operation and the remaining payment money-amount thereof can be paid out by the money paying-out apparatus. Time required for the money amount, including the new bill, to be paid out is rendered shorter and transaction error is prevented from being caused.

The above described embodiment shows a case where some portion of the payment money-amount is specified in denomination, the remaining portion thereof is specified in manual operation, and a case where the denomination is not specified. Without being restricted to the present invention, the denomination is specified only about the money amount to be manually instructed, but the remaining portion of the payment money-amount is not specified in denomination. The denomination data may be automatically calculated by the calculation of the minimum number.

In the embodiment, the zero proof processing (at the stages n74, n75, n78) is caused to be located after the stage n73. However, without being restricted to it, it may be inserted between the stage (n61) and the stage (n62). The stage (n62) of the sequence of the next data-payment instruction may be caused to be performed in accordance with the results of the zero proof processing.

Although the present invention has fully been described in connection with the preferred embodiments thereof with reference to the accompanying drawings, it is to be noted that various changes and modification are apparent to those skilled in the art. Such changes and modifications are to be understood as included within the scope of this invention unless they depart therefrom.

What is claimed is:

1. A cash accounting system wherein a cash accounting apparatus for registering and processing various cash transaction informations is electrically connected with a money paying-out apparatus for paying out money such as bills, coins, corresponding to the amount due caused by each transaction registration, comprising a manual handling instruction unit for instructing the manual handling operation of some denominations and sub-amounts of said payment money-amount, a storing unit for storing the denominations, sub-amounts, etc. instructed to be manually handled by said instruction unit, and a controlling unit for paying out, by said money paying-out apparatus, the remaining payment amount of the money amount instructed to be manually handled by said manual handling instruction unit.

* * * * *